United States Patent Office 3,493,652
Patented Feb. 3, 1970

3,493,652
CONTROLLED RELEASE MEDICAMENT
Charles W. Hartman, Apt. C–6, North Gate, University of Mississippi, University, Miss. 38677
No Drawing. Continuation-in-part of abandoned application Ser. No. 105,298, Apr. 25, 1961. This application Sept. 14, 1962, Ser. No. 223,810
Int. Cl. A61k 9/00, 19/00, 19/02
U.S. Cl. 424—94                                11 Claims This application is a continuation-in-part of application Ser. No. 105,298, filed Apr. 25, 1961, and now abandoned.

This invention relates to a new and improved form of pharmaceutical preparation. More particularly, this invention realtes to pharmaceutical preparations providing for the controlled release of a medicament from the dosage form in which the medicament is embodied.

The administration of active medicaments in proper amount involves many factors which affect the formulation of a suitable dosage form. In the case of oral dosage forms it is frequently desirable to have the active material available immediately as in the case of a form which releases the medicament as soon as it enters the mouth. If, however, the drug is bad tasting, the release of the drug is delayed until it enters the stomach or, if irritating to the stomach, until it enters the intestine. Sometimes the dosage form is designed to release the medicament gradually over a relatively long period of time. Similar considerations apply to parenteral dosage forms.

The time and rate of release of medicament is generally managed by incorporating the active material in a vehicle or vehicles which retain the substance until they respond to the conditions of the environment. Thus, for example, the moisture in the mouth may be relied upon to distintegrate the carrier and release the drug. In other instances, the vehicle may resist moisture but break down under the warmth or acid conditions of the stomach, the alkaline condition of the intestine, etc. Sustained release forms may rely upon gastric fluids to leach out the active material. In large measure, body secretions are relied upon to effect the release of the medicament. Due to the highly variable conditions to which it is subjected both without and within the body, the preparation of medicinal dosage forms, especially the sustained release forms, are difficult to formulate.

It is an object of this invention to provide a pharmaceutical preparation having wide applicability and providing an improved means for regulating the release rate and the rate of absorption of the medicament in the system. It is an especial object of this invention to provide a preparation particularly adapted to give close control of release and absorption in oral dosage forms.

Control of the intensity and duration of drug action depends to a great extent on the control of absorption. The variability of the physical and chemical properties in the body is largely responsible for the difficulties encountered in regulating absorption of medicaments. The variability in conditions in the gastro-intestinal tract in particular create difficulties in formulating oral dosage forms.

It has been known heretofore to make pharmaceutical preparations which will permit the maintenance of a desired level of a therapeutic agent over a period of time. In general, such preparations have been provided through the use of materials resistant to distintegration in the gastroinestinal tract as carriers or coatings for the active therapeutic agent.

It has now been discovered in accordance with this invention that controlled release preparations of wide applicability and susceptible of close regulation can be prepared through the use of a combination of enzymes with selected substrates. Enzymes in combination with substrates can control, can increase or decrease, the release and absorption of a medicament from solid, semi-solid, or liquid dosage forms intended for either internal or external administration. The enzyme, when activated, acts upon the substrate and effects its elimination. By selectively choosing the substrate or substrates and the respective enzyme or enzymes for digestion of the substrate, as well as other components, and by varying the concentration of both the enzymes and the substrates, disintegration of and absorption from dosage forms can be regulated. The medicament can be separated from its base by this method and thereby be absorbed more readily by the body tissues. The dosage form is thus not so closely dependent upon body secretions which may be absent or present in inadequate amount. These considerations are applicable to a variety of medicinal dosage forms, as will be seen later, but are particularly adaptable to oral dosage forms.

The novel compositions of the present invention will, then, comprise the combination of (1) a medicament, (2) a substrate, (3) an enzyme and, if desired, ancillary agents such as (4) activators or inhibitors, (5) antienzymes and (6) other materials which are conventionally employed in the preparation of known dosage forms. The inclusion of an enzyme with the substrate renders the composition substantially independent of the conditions in the body. Moreover, they are also readily susceptible of control prior to administration.

The novel compositions of this invention contain a medicament as one essential component and any desired medicament or combination of medicaments can be employed. Depending on whether the medicament is to be released all at once or in a relatively short period, or whether it is to be released over an extended period of time, e.g. 8 to 12 hours, a normal single dose or some multiple thereof is incorporated in the composition. Thus the medicament may be adrenergic agents such as ephedrine, desoxyephedrine, phenylephrine, epinephrine and the like, cholinergic agents such as physiostigmine, neostigmine and the like, antispasmodic agents such as atropine, methantheline, papaverine and the like, curariform agents such as chlorisondamine and the like, tranquilizers and muscle relaxants such as fluphenazine, chlorpromazine, triflupromazine, mephenesin, meprobamate and the like, antihistamines such as diphenhydramine, dimenhydrinate, tripelennamine, perphenazine, chloroprophenazine, chlorphophenpyridamine and the like, hypotensive agents such as rauwolfia, reserpine and the like, cardioactive agents such as benzydroflumethiazide, flumethiazide, chlorothiazide, aminotrate and the like, steroids such as testosterone, fludrocortisone triamcinolone, triamcinolone acetonide, cortisone, prednisolone and the like, antibacterial agents, e.g. sulfonamides such as sulfadiazine, sulfamerazine, sulfamethazine, sulfisoxazole and the like, antimalarials such as chloroquine and the like, antibiotics such as the tetracyclines, nystatin, streptomycin, penicillin, griseofulvin and the like, sedatives such as chloral hydrate, phenobarbital and other barbiturates, glutethimide, antitubercular agents such as isoniazid and the like, analgesics such as aspirin, meperidine and the like, etc. Other therapeutic agents having the same or different physiological activity as those recited above can obviously be employed in pharmaceutical preparations within the scope of the present invention.

The second component employed in the preparation of the novel pharmaceutical preparations of this invention is the substrate. The substrate can be any agent which is susceptible to the action of hydrolyzing or desmolyzing enzymes. The substrate is primarily the base or vehicle for the active medicament and, until it is separated from the medicament, prevents or retards its release. The base or substrate is therefore so chosen that it will retain the medicament under the various conditions it will encounter until the dosage form completes its function. That is, it may be chosen to resist moisture, acid, alkali, heat, body secretions or any combination of these. It is subject in greatest measure to the action of the enzyme selected to act cooperatively with it.

The substrate may be a chemical entity in itself or it may comprise a portion of another substance. The substrate may be a constituent not commonly employed in particular pharmaceutical preparations, added for the sole purpose of serving as a substrate. The substrate may serve the added function of an additive, binder, filler, lubricant, disintegrating agent, solvent or other vehicle, diluent or adsorbent. Various starches, fats, proteins and carbohydrates may be used, singly or in combination, as the substrate in the novel compositions of this invention. Examples of specific substrates will be set forth hereinafter as they may be employed in their combinations with particular enzymes.

The third component of the compositions of this invention comprises an enzyme, enzyme precursor or a substance containing an enzyme. The enzyme acts upon the base or substrate by digestion to separate it from the medicament and thereby remove any restraint upon the release of the active material. The choice of enzyme depends upon the type of action desired. An enzyme may be selected which acts quickly upon the substrate and promptly separates it from the medicament. An enzyme which more slowly digests the substrate slows the release of the medicament. The use of an enzyme precursor delays digestion of the substrate until the enzyme itself is produced from the precursor.

An enzyme may be selected which is only activated under certain conditions. Thus an enzyme may be selected which is activated by moisture. Such an enzyme will quickly digest a substrate so as to release a medicament in the mouth. Other enzymes which are activated in an acid environment are useful for release of medicaments in the stomach, and so on. The concentration of substrate and enzyme also vary the rate of release so that by suitable choice of enzyme and substrate, wide variation in rate of release under controlled conditions is possible.

The enzymes employed include hydrolases, desmolases or the other enzymes that add groups to double bonds. [See Dixon and Webb, "Enzymes" (Academic Press, N.Y.), 1958.] The hydrolases may be carbohydrases, esterases, glucosidases, proteases, amidases or coagulases. Representative examples of suitable specific enzymes from the class of hydrolases are: lipase, lecithinase A, lecithinase B, cholesterase, pectase, tannase, phosphorylase, invertase, maltase, emulsin, cellobiase, myrosinase, melibiase, lactase, alpha-amylase, cellulase, hemicellulase, inulase, lichenase, hyaluronidase, protopectinase, pectinase, rennin, thrombin, pepsin, trypsin, cathepsin, ficin, papain, bromelin, lysozyme, keratinase, protaminase, aminopeptidase, urease, amino acid decarboxylases.

Enzymes that add groups to double bonds are carbonic anhydrase and the like.

The desmolases employed may be zymases, oxidases, dehydrogenases or reductases. Representative examples are lactacidase, endotryptase, aldehydases, alcoholidases, lactases, and hydrogenase. In addition to the enzymes, enzyme precursors may also be used to alter the time of digestion of the dosage form, for example pepsinogen, chymotrypsin, etc. The term enzymes as employed herein includes such enzyme precursors.

The enzymes or enzyme precursors may be employed alone or in combination to effect a particular desired sequence of release for one or more medicaments.

The pharmaceutical preparations of this invention may also contain other agents selected and employed for the achievement of particular effects in the various dosage forms according to conventional procedure. Thus, the compositions may contain stabilizing agents, surface active materials, coloring and flavoring materials and like ancillary agents where the particular function of that agent is necessary to or desirable in the preparation of the particular dosage form.

In addition, enzyme inhibitors, activators, or anti-enzymes may be incorporated into the compositions in order to further control the rate of digestion of the substrate in the dosage form by the enzyme. Buffering agents may also be employed to assist in the regulation of the rate of release of the medicament in particular instances. Enzyme precursors may be used to further regulate the time of disintegration of dosage forms.

The pharmaceutical preparations of this invention may take the form of solid, semi-solid or liquid preparations and can be used for either external or internal administration. Thus, by the proper combination of enzyme and substrate, the controlled release of medicament can be effected from troches, tablets, capsules, powders, ointments, pastes, creams, suppositories, lotions, linaments, syrups, emulsions, solutions, suspensions and elixirs. These dosage forms may be produced according to conventional procedures, e.g. according to the techniques described in the standard work "Remington's Practice of Pharmacy."

The enzyme and substrate may be incorporated into the particular dosage form at any convenient stage of the manufacturing process. They may be added in such a manner as to provide a homogeneous distribution of enzyme and substrate throughout the dosage form or, alternatively, the enzyme may be separated from the substrate as by use of intermediate layers of other materials. Similarly, the medicament may be homogeneous with either or both of the substrate and enzyme or it may be separated.

In the systems described, relatively small amounts of substrate and enzyme are required in proportion to active substance so that greater concentrations of drug may be provided in the conventional forms. In addition, the preparations may be readily protected from environmental conditions prior to administration. Systems activated in the presence of moisture may be packaged in dry containers under an inert gas. Coatings resistant to heat or acid or alkali may be provided as the case requires.

From among the many combinations of enzymes and substrates which are possible, the following typical combinations are listed for purposes of illustration. The same enzyme from several sources or combinations of enzymes from different sources of materials containing enzymes may be used.

| Enzyme: | Substrate |
| --- | --- |
| Lipase | Fats and oils; materials containing fats and oils. Synthetic glyceryl fatty acids. |
| Lecithinase A | Lecithin; materials containing lecithin. |
| Lecithin B | Lysolecithin, etc. |
| Cholesterase | Cholesterol esters. |
| Pectase | Pectin. |
| Tannase | Tannin. |
| Phosphorylases | Glycogen. |
| Invertase | Sucrose. |
| Maltase | Maltose. |
| Emulsin | $\beta$-Glucosides. |
| Cellobiase | Cellobiose. |
| Takadiastase | Starch (amylopectin). |
| Pancreatin | Starch, protein, lipids. |
| Myrosinase | $\alpha$ and $\beta$-Glucosides. |
| Melibiase | Raffinose. |
| Lactase | Lactose. |
| Alpha amylase | Soluble starch, glycogen, dextrins. |
| Beta amylase | Soluble starch. |
| Cellulase | Cellulose and derivatives and materials containing cellulose. |
| Hemicellulase | Hemicellulose. |

| Enzyme: | Substrate |
|---|---|
| Inulase | Inulin. |
| Lichenase | Lichenin. |
| Hyaluronidase | Hyaluronic acid. |
| Protopectinase | Protopectin. |
| Pectinase | Pectic acid. |
| Rennin | Casein. |
| Thrombin | Fibrinogen. |
| Pepsin | Proteins. |
| Trypsin | Proteins. |
| Cathepsin | Proteins. |
| Ficin | Proteins. |
| Papain | Proteins. |
| Bromelin | Proteins. |
| Lysozyme | Glycoproteins. |
| Keratinase | Keratins. |
| Protaminase | Protamines. |
| Aminopeptidase | Polypeptides with free amino groups. |
| Urease | Urea. |
| Amino acid decarboxylases | Amino acids. |

By using the above and analogous combinations in the same dosage form and varying the concentrations of any one or more of these ingredients, the rate of release and absorption of the medicament or medicaments present in the dosage form can be accurately controlled over an extended period of time. Further control of the rate of release and absorption can be obtained through the use of appropriate enzyme inhibitors or activators or buffering agents.

The proportion of substrate and enzyme or enzymes used will vary within broad limits depending upon the rate and site of disintegration desired as well as upon the characteristics of the medicament involved. In general, about 1/100 parts to about 1 part by weight of enzyme for each part by weight of the medicament may be used. About 500 parts to about 10 parts by weight of substrate for each part of enzyme should be incorporated in the formulation. These ratios will vary depending on the type of enzyme, substrate, etc. used and the digestion rate desired. Other components such as vehicles, extenders, binders, excipients, etc., are used as required in forming the tablet, capsule, elixir, ointment, etc., as the case may be. If any of these additional materials function also as substrate suitable allowances should be made in the proportions indicated.

It must be emphasized that enzyme substrate reactions follow fundamental principles of the kinetics of chemical reactions. The reactions are generally first order, i.e., the rate of the reaction is proportional to the enzyme concentration and if the enzyme concentration is doubled the reaction rate should also be doubled if the substrate concentration is low. When the enzyme concentration is kept at a constant value and the substrate is increased the rate of reaction will reach a maximum velocity point at which time reaction will be independent of substrate concentration.

Further regulation of digestion velocity and drug release is obtained by using inactive enzyme precursors that require time to be activated. Also, these reactions are altered by different pH ranges and will proceed at different rates in gastric and intestinal fluids. Chymotrypsin for example, will be activated in the intestinal fluid.

There are certain enzymes that will in general provide rapid release in the gastric fluid and a slower release in intestinal fluid while others react slowly in gastric fluid but faster in intestinal fluid. Also where a series of reactions must take place involving several enzymes the enzyme digestion rate will depend on the rate of digestion for each step in the process. In addition, one step may occur in the gastric fluid and the second step will not occur until the substrate and enzymes reach the intestinal fluid. These rates, however, may be altered by addition of buffers, inhibitors, antienzymes, etc.

By the proper selection of such enzymes, the point at which disintegration takes place can be controlled. Also by using combinations of granules made from various substrates and enzymes a dosage form can be made which will disintegrate over a long period of time in gastric and finally in intestinal fluid.

For example, one preferred combination comprising diastase, lipase, starch, gelatin, gelatinase and tristearin used with sulfanilamide in tablet form results in the release of approximately 30% sulfanilamide in gastric fluid and the remaining 70% is released in approximately 4½ hours in intestinal fluid. A tablet containing a combination of starch paste, diastase, lipase and tristearin together with sulfadiazine releases 35–40% sulfadiazine in gastric fluid and 60–65% over a 4 to 5 hour period in intestinal fluid.

The various pharmaceutical dosage forms will contain general combinations such as the following:

Suspension:
    Medicament
    Lipid
    Lipase
Emulsion (liquid, semisolid or solid):
    Medicament
    Water
    Lipid
    Lipase
Tablet (sublingual, buccal, oral or vaginal):
    Medicament
    Protein, carbohydrate, lipid
    Hydrolase enzymes
Capsules:
    Medicament
    Protein, carbohydrate, lipid
    Enzyme
Ointments:
    Medicament
    Lipid, carbohydrate, protein
    Enzyme
Suppositories:
    Medicament
    Lipid, carbohydrate, protein
    Enzyme For a fuller understanding of the nature of this invention, reference should be had to the following examples which are given merely as further illustrations of the invention and are not to be construed in a limiting sense. All parts are given by weight.

EXAMPLE 1

The following ingredients are combined in the preparation of sustained release sulfanilamide tablets:

| | Parts |
|---|---|
| Sulfanilamide | 91.5 |
| Takadiastase | 3 |
| Magnesium stearate | 0.5 |
| Starch (as starch paste) | 5.0 |

A tablet granulation is prepared from these ingredients by admixing 30 parts of sulfanilamide with the three parts of takadiastase. The mixture is worked until it granulates and is then passed through a 24 mesh screen. The remaining 65 parts of the sulfanilamide is admixed with the starch paste and worked until granulation occurs. It is then passed through a 24 mesh screen, thoroughly admixed with the drug-enzyme granulation and the mixture is tray dried at 130° F. for about 5 hours. The dry granulation is mixed with the previously sieved magnesium stearate and the resulting granulation is then compressed into tablets each containing 0.5 gm. of sulfanilamide. This product disintegrates in less than 15 minutes in gastric fluid.

EXAMPLE 2

Sulfanilamide tablets each containing 0.5 gm. of the sulfonamide are prepared by granulating and compressing the following ingredients by the same procedure as described in Example 1:

| | Parts |
|---|---|
| Sulfanilamide | 70 |
| Lipase (wheat germ) | 5.0 |
| Magnesium stearate | 0.5 |
| Starch (as starch paste) | approx. 5 |
| Hydrogenated cottonseed oil | 20 |

This product disintegrates in the intestinal fluid within one hour.

EXAMPLE 3

Tablets, each containing 0.5 gm. of sulfanilamide, are prepared according to the procedure described in Example 1 from the following ingredients and containing 1%, 2% of papain, respectively:

| | Parts |
|---|---|
| Sulfanilamide | 90 |
| Gelatin (10% soln. used) | approx. 5 |
| Papain | 1–2 |

Tablets made according to the above formula have the following disintegration rates:

Simulated gastric fluid, U.S.P.

| Percent Papain: | Minutes |
|---|---|
| 1 | 118 |
| 2 | 54 |

Tablets, each containing 0.5 of sulfanilamide, are prepared according to the procedure of Example 1 from the following formulations:

EXAMPLE 4

| | Parts |
|---|---|
| Sulfanilamide | 85 |
| Starch (as starch paste) | approx. 10 |
| Pancreatin | 5 |
| Magnesium stearate | 0.5 |

EXAMPLE 5

| | Parts |
|---|---|
| Sulfanilamide | 85 |
| Gelatin (as 10% soln.) | approx. 10 |
| Pepsin | 5 |
| Magnesium stearate | .5 |

EXAMPLE 6

| | Parts |
|---|---|
| Sulfanilamide | 85 |
| Gelatin, (as 10% soln.) | approx. 10 |
| Papain | 5 |
| Magnesium stearate | .5 |

EXAMPLE 7

| | Parts |
|---|---|
| Sulfanilamide | 85 |
| Starch (as starch paste) | 10 |
| Alpha amylase | 5 |

EXAMPLE 8

| | Parts |
|---|---|
| Sulfanilamide | 85 |
| Sucrose (as a soln.) | 10 |
| Invertase | 5 |

EXAMPLE 9

| | Parts |
|---|---|
| Sulfanilamide | 80 |
| Starch (as paste) | 5 |
| Sucrose (as soln.) | 5 |
| Invertase | 5 |
| Alpha amylase | 5 |

By varying the concentration and combinations of granules prepared in the formulas of Examples 1 to 9 and by variation of the enzyme and substrate concentration in each formula, tablets can be prepared that will give a continued release over a long period of time. Also fast or slow release can be obtained. Release may also be delayed for several hours.

EXAMPLE 10

Sublingual tablets, each containing 0.005 gm. of nitroglycerin, are prepared by conventional dry granulation procedure from the following ingredients:

| | Parts |
|---|---|
| Nitroglycerin | .050 |
| Lactose | 10.0 |
| Starch powder | 80.0 |
| Takadiastase | 5.0 |
| Starch (as starch paste) | approx. 5.0 |

The tablets disintegrate in neutral solution in less than 5 minutes.

The release of the drug can be accelerated by increasing the amount of takadiastase. Alpha amylase and beta amylase may also be added to increase the rate of digestion. Average in vivo sublingual disintegration is 4 minutes.

EXAMPLE 11

A suspension is prepared from the following ingredients:

| | Parts |
|---|---|
| Glycerin | 10 |
| Sulfadiazine | 10 |
| Cottonseed oil | 20 |
| Corn oil | 20 |
| Triolein | 10 |
| Peanut oil | 20 |
| Lipase | 10 |

EXAMPLE 12

An emulsion is prepared from the following ingredients:

| | Parts |
|---|---|
| Sulfadiazine | 10 |
| Water | 40 |
| Cottonseed oil | 40 |
| Lipase | 10 |

EXAMPLE 13

A tablet is prepared from the following ingredients:

| | Parts |
|---|---|
| Methyl testosterone | 2.500 |
| Starch | 45 |
| Beta amylase | 5 |
| Lactose | 17.5 |
| Sucrose | 25 |
| Starch (as starch paste) | 5 |

EXAMPLE 14

An ointment is prepared from the following ingredients:

| | Parts |
|---|---|
| Sulfadiazine | 5 |
| Hydrogenated cottonseed oil | 50 |
| Starch | 10 |
| Lipase | 10 |
| Petrolatum | 25 |

EXAMPLE 15

A suppository is prepared from the following ingredients:

| | Parts |
|---|---|
| Pentobarbital | 5 |
| Lipase | 15 |
| Hydrogenated cottonseed oil | 80 |

EXAMPLE 16

The following ingredients are mixed in the proportions indicated:

(A)

| | Parts |
|---|---|
| Soluble starch | 5 |
| Tristearin | 20 |
| Sulfanilamide | 70 |
| Gelatin (as binder) | 5 |

(B)

| | |
|---|---|
| Diastase | 2 |
| Lipase | 3 |
| Gelatinase | 3 |
| Magnesium stearate | 0.5 |
| Formula A | 91.5 |

The two formulas are mixed and compressed into tablets according to conventional procedure.

The disintegration results (in vito) are as follows:

| Time: | Percent sulfanilamide released |
|---|---|
| Gastric fluid— | |
| 30 min. | 18.0 |
| 60 min. | 29.0 |
| Intestinal fluid | |
| 90 min. | 45.0 |
| 120 min. | 60.0 |
| 180 min. | 78.0 |
| 240 min. | 87.0 |
| 300 min. | 94.0 |
| 360 min. | 98.0 |

What is claimed is:

1. A controlled-release solid, semi-solid, or liquid oral, topical, sublingual, parenteral, implantable, rectal or vaginal dosage form which consists, in a homogenous distribution throughout the dosage form, essentially of:
   (a) a therapeutic oral, topical, sublingual, parenteral, implantable dosage unit quantity of a non-enzymatic medicament,
   (b) an enzyme-labile pharmaceutical carbohydrate, lipid or protein vehicular substrate which retains the medicament and prevents or retards its release until separated from the medicament, and
   (c) a pre-selected enzyme, or mixtures thereof, for digesting said carbohydrate, lipid, or protein vehicular substrate, said enzyme or mixture thereof being present in a predetermined amount, sufficient to effect digestion by in-vitro gastric and/or intestinal fluid, or by in-vitro sublingual disintegration, or by other body fluids of said substrate and thereby to control the in-vivo release of said medicament at a predetermined rate.

2. A controlled-release dosage form in accordance with claim 1 wherein said enzyme-labile substrate (b) is a lipid, and said enzymes (c) are lipases.

3. A controlled-release dosage form in accordance with claim 1 wherein said enzyme-labile substrate (b) is a carbohydrate, and said enzymes (c) are carbohydrases.

4. A controlled-release dosage form in accordance with claim 1 wherein said enzyme-labile substrate (b) is a protein, and said enzymes (c) are proteinases.

5. A controlled-release dosage form in accordance with claim 1 wherein said enzyme-labile substrate (b) is a cellulose derivative, and said enzyme (c) is cellulase.

6. A controlled-release dosage form in accordance with claim 1 wherein said enzyme-labile substrate (b) is pectin, and said enzyme (c) is pectinase.

7. A controlled-release dosage form in accordance with claim 1 wherein said enzyme-labile substrate (b) is selected from the group consisting of starch and amylopectin.

8. A controlled-release dosage form in accordance with claim 1 wherein said enzyme-labile substrate (b) is a gum, and said enzyme (c) is hemicullulase.

9. A controlled-release dosage form in accordance with claim 1 wherein said medicament (a) is a sulfonamide, said enzyme-labile substrate (b) is gelatin, and said enzyme (c) is papain.

10. A controlled-release dosage form in accordance with claim 1 wherein said medicament (a) is a sulfonamide, said enzyme-labile substrate (b) is hydrogenated cottonseed oil, and said enzyme (c) is lipase.

11. A controlled-release dosage form in accordance with claim 1 wherein said enzyme-labile substrate (b) is starch, and said enzyme (c) is diastase.

References Cited

UNITED STATES PATENTS

| | | | |
|---|---|---|---|
| 650,760 | 5/1900 | Metcalf | 167—83 |
| 2,887,435 | 5/1959 | Witty et al. | 167—58 |
| 3,004,893 | 10/1961 | Martin | 167—73 |
| 3,081,225 | 3/1963 | Farnham et al. | 167—53 |
| 3,181,998 | 5/1965 | Kanig | 167—82 |
| 671,804 | 4/1901 | Metcalf | 167—82 |
| 1,546,820 | 7/1925 | Ballard et al. | 167—73 |
| 2,801,203 | 7/1957 | Leb et al. | 167—95 |
| 2,878,123 | 3/1959 | Beuk et al. | 99—2 |
| 2,891,868 | 6/1959 | Heggie et al. | 99—135 |
| 2,906,621 | 9/1959 | Catron | 99—2 |
| 2,924,521 | 2/1960 | Hewitt | 99—1 |

SHEP K. ROSE, Primary Examiner

U.S. Cl. X.R.

424—35, 36, 37, 38, 359, 360, 361, 362, 19

UNITED STATES PATENT OFFICE
CERTIFICATE OF CORRECTION

Patent No. 3,493,652              Dated February 3, 1970

Inventor(s) Charles W. Hartman

It is certified that error appears in the above-identified patent and that said Letters Patent are hereby corrected as shown below:

Column 1, line 16, change "realtes" to -- relates --.

Column 2, line 39, change "physiostigmine" to -- physostigmine --.

Column 9, line 10, change "vito" to -- vitro --.

SIGNED AND SEALED
NOV 24 1970

(SEAL)
Attest:

Edward M. Fletcher, Jr.
Attesting Officer

WILLIAM E. SCHUYLER, JR.
Commissioner of Patents